Patented Jan. 14, 1941

2,228,884

UNITED STATES PATENT OFFICE 2,228,884

PRODUCTION OF 1,4-DI-(MONO-SUBSTITUTED-AMINO)-ANTHRAQUINONE COMPOUNDS

Henry Charles Olpin and Charles Finley Topham, Spondon, near Derby, England, assignors to Celanese Corporation of America, a corporation of Delaware No Drawing. Application December 28, 1937, Serial No. 182,167. In Great Britain December 8, 1937

10 Claims. (Cl. 260—379)

This invention relates to the manufacture of 1,4-di-(mono-substituted-amino)-anthraquinones in which the substituents in the amino groups are different, and particularly compounds in which the said substituents are aliphatic groups.

We have found that the above mentioned 1,4-di-(mono-substituted-amino)-anthraquinones can very satisfactorily and conveniently be obtained from leuco 1,4-aminohydroxy-anthraquinones and two different primary amines. By the action of the two amines on the leuco 1,4-aminohydroxy-anthraquinone a leuco compound of the required 1,4-di-(mono-substituted-amino)-anthraquinone is obtained, and this can readily be converted into the 1,4-di-(mono-substituted-amino)-anthraquinone itself.

The amines may be allowed to react in succession on the leuco 1,4-amino-hydroxy-anthraquinone, but more conveniently they are allowed to act together on the leuco compound.

The new process is of special value for the production of 1,4-di-(mono-substituted-amino)-anthraquinones in which the substituents in the amino groups are both aliphatic groups, for example methyl, ethyl, propyl or other alkyl groups or hydroxyethyl, hydroxypropyl or other hydroxyalkyl groups. To this end the corresponding alkylamines or hydroxyalkylamines are employed. Special mention may be made of the application of the new process to the production of 1,4-di-(mono-substituted-amino)-anthraquinones in which one of the substituents in the amino groups is an alkyl group and the other substituent is a hydroxyalkyl group. Examples of such compounds are 1-methylamino-4-hydroxyethyl-amino-anthraquinone, 1-methylamino-4-hydroxypropyl-amino-anthraquinone, and 1-propylamino-4-hydroxyethyl-amino-anthraquinone.

Correspondingly substituted 1,4-diamino-anthraquinones may be obtained by using an amine of different kind in place of one or both aliphatic amines. For instance arylamines, cyclo-alkylamines and aralkylamines may be used. The process is, however, of special value for the production of 1,4-di-(mono-substituted-amino)-anthraquinones in which each of the substituents is united to the amino group at a carbon atom which is non-aromatic in character, that is to say a carbon atom which does not form part of an aromatic ring. Such is the case, of course, when the substituent is an aliphatic group and also when the substituent is a cyclo-alkyl group, e. g. cyclohexyl, or an aralkyl group, e. g. benzyl.

As the parent material there may be employed leuco 1,4-aminohydroxy-anthraquinone itself or the substitution products thereof free from substituents in the 2- and 3-positions of the anthraquinone nucleus. The further substituents may be, for example, amino groups, hydroxy groups, alkoxy groups, sulphonic groups, and halogen atoms.

Examples of such substituted leuco 1,4-aminohydroxy-anthraquinones are leuco 1-amino-4,5-dihydroxy-anthraquinone and leuco 1-amino-4,5,8-trihydroxy-anthraquinone.

The reaction between the leuco 1,4-aminohydroxy-anthraquinone and the two amines is conveniently effected in the presence of a liquid diluent, particularly a liquid which is a solvent for one or more of the reactants. Water or an aliphatic alcohol, e. g. ethyl alcohol, propyl alcohol, or butyl alcohol, is suitable.

The reaction is advantageously effected at a temperature of from 70 to 120° C. and either in an open vessel, or under reflux, or under pressure, as may be convenient according to the temperature employed and the nature of the amines and/or any diluent employed.

As regards the proportions of the reactants, very satisfactory results may be obtained when about one molecular proportion, or a little more, of each amine is employed to each molecular proportion of the leuco 1,4-aminohydroxyanthraquinone.

Leuco 1,4-aminohydroxyanthraquinone for use in accordance with the new process can be prepared from leuco 1,4-dihydroxy-anthraquinone and ammonia in the manner described in British Patent No. 507,065 of Henry Charles Olpin. A particularly satisfactory procedure is to prepare a solution or suspension of leuco 1,4-aminohydroxy-anthraquinone by the action of ammonia on leuco quinizarin, as described in the said application, and without isolating the leuco compound to add the two amines and heat to effect production of the leuco compound of the desired 1,4-di-(mono-substituted-amino)-anthraquinone. For example 1-methylamino-4-hydroxyethyl-aminoanthraquinone can be prepared by stirring leuco quinizarin with alcoholic ammonia at ordinary temperature to effect formation of leuco 1,4-aminohydroxyanthraquinone and then adding the requisite proportion of mono-methylamine and mono-ethanolamine and heating. The leuco 1-methylamino-4-hydroxyethylamino-anthraquinone is then converted into the parent compound. The invention specifically includes the production of the 1,4-di-(mono-substituted-amino)-anthraquinones by the action of two different amines, successively or together, on the amidated products obtainable by the action of ammonia on leuco quinizarin or appropriate substitution products thereof.

The conversion of the leuco 1,4-di-(mono-substituted-amino)-anthraquinones into the parent 1,4-di-(mono - substituted - amino) - anthraquinones may be effected by any convenient oxidising treatment, for example by heating with nitrobenzene, by the action of free oxygen in the presence of pyridine or piperidine, or by the action of a substance capable of taking up hydrogen as described in British Patent No. 482,582 of Geoffrey Lord and George Reeves. The treatment necessary for the conversion may be applied to the leuco compound either in the reaction liquid in which it has been formed or after isolation, according to the particular method of conversion selected. In the case of the above-mentioned 1-methylamino-4-hydroxy-ethylamino - anthraquinone, the conversion is very conveniently effected in the reaction liquid by adding small proportions of pyridine and a copper salt and blowing in air.

The invention is illustrated by the following example:

An iron autoclave is charged with the following: 2,100 grams of leuco quinizarin, 7,000 ccs. of industrial spirit and 3,150 ccs. of aqueous ammonia, specific gravity .880. The autoclave is sealed and the contents stirred at ordinary temperature for 72 hours. 530 ccs. of monoethanolamine and 725 grams of a 38.5% solution of monomethylamine are then added and after stirring for 12 hours the autoclave is heated to 90° C. for 16 hours. After cooling 20 grams of copper sulphate and 100 ccs. of pyridine are added and air blown through, with the liquid at a temperature of 75° C., until conversion of the leuco 1-methylamino-4-hydroxy-ethylamino - anthraquinone to the parent compound is complete. The contents of the autoclave are then blown on to a filter and the solid product, the 1-methylamino-4-hydroxy - ethylamino - anthraquinone, well washed with water.

Having described our invention, what we desire to secure by Letters Patent is:

1. The process which comprises producing leuco 1,4-di-(mono-substituted-amino)-anthraquinones wherein the substituents in the amino groups are different, by subjecting a leuco 1,4-dihydroxy-anthraquinone to the action of a solution of ammonia until it is substantially converted to a leuco 1-amino-4-hydroxy-anthraquinone and then, without isolating the latter, causing it to react with two different primary amines.

2. The process which comprises producing leuco 1,4-(mono-substituted-amino)-anthraquinones wherein the substituents in the amino groups are different, by subjecting leuco quinizarin to the action of a solution of ammonia until it is substantially converted to leuco 1-amino-4-hydroxy-anthraquinone and then, without isolating the latter, causing it to react with two different primary amines.

3. The process which comprises producing leuco 1,4-di-(mono-substituted-amino)-anthraquinones wherein the substituents in the amino groups are different, by subjecting leuco quinizarin to the action of a solution of ammonia until it is substantially converted to leuco 1-amino-4-hydroxy-anthraquinone and then, without isolating the latter, causing it to react with an alkylamine and an alkylolamine.

4. Process for the production of a leuco 1,4-di-(mono - substituted - amino) - anthraquinone wherein the substituents in the amino groups are different, which comprises subjecting leuco quinizarin to the action of an aqueous alcoholic solution of ammonia in the cold until the leuco quinizarin is substantially converted to leuco 1-amino-4-hydroxy-anthraquinone and then, without isolating the latter, subjecting it to the action of a mixture of two different primary aliphatic amines.

5. The process which comprises producing leuco 1-methylamino-4-ethanolamino anthraquinone by subjecting leuco quinizarin to the action of an aqueous alcoholic solution of ammonia in the cold until the leuco quinizarin is substantially converted into leuco 1-amino-4-hydroxy-anthraquinone and, without isolating the latter, subjecting it to the action of a mixture of methylamine and mono-ethanolamine.

6. The process which comprises producing 1,4-di-(mono - substituted - amino) - anthraquinones wherein the substituents in the amino groups are different, by subjecting a leuco 1,4-di-hydroxy-anthraquinone to the action of a solution of ammonia until it is substantially converted to a leuco 1-amino-4-hydroxy-anthraquinone, and then, without isolating the latter, causing it to react with two different primary amines and converting the product into a 1,4-di-(mono-substituted-amino)-anthraquinone by an oxidation treatment.

7. The process of producing 1,4-di-(mono-substituted - amino) - anthraquinones wherein the substituents in the amino groups are different, which comprises forming leuco-1-amino-4-hydroxy-anthraquinone by subjecting leuco quinizarin to the action of a solution containing substantially more ammonia than is required to convert the leuco quinizarin to leuco 1-amino-4-hydroxy-anthraquinone, and then, without isolating the leuco 1 - amino - 4 - hydroxy - anthraquinone, causing it to react with an alkylamine and an alkylolamine and converting the product into a 1,4-di-(mono-substituted-amino) - anthraquinone by an oxidation treatment.

8. Process for the production of a 1,4-di-(mono - substituted - amino) - anthraquinone wherein the substituents in the amino groups are different, which comprises subjecting a leuco quinizarin to the action of an aqueous alcoholic solution of ammonia in the cold until the leuco quinizarin is substantially converted to a leuco 1 - amino - 4 - hydroxy - anthraquinone, and then without isolating the latter, causing it to react with a mixture of two different primary aliphatic amines and converting the product into a 1,4-di-(mono-substituted-amino)-anthraquinone by an oxidation treatment.

9. Process for the production of 1-methylamino-4-ethanolamino-anthraquinone which comprises forming leuco 1-amino-4-hydroxy-anthraquinone by subjecting leuco quinizarin to the action of a cold aqueous alcoholic solution containing more ammonia than is required to convert the leuco-quinizarin to leuco 1-amino-4-hydroxy-anthraquinone, and then, without isolating the leuco 1-amino-4-hydroxy-anthraquinone, causing it to react with a mixture of methylamine and mono-ethanolamine and converting the product into 1-methylamino-4-ethanolamino-anthraquinone by an oxidation treatment.

10. The process of producing a leuco 1,4-di-(mono-substituted-amino)-anthraquinone wherein the substituents in the amino groups are different, which comprises forming a leuco 1-amino-4-hydroxy-anthraquinone by subjecting a leuco 1,4-dihydroxy-anthraquinone to the action of a solution containing substantially more ammonia than is required to convert the leuco 1,4-dihydroxy-anthraquinone to a leuco 1-amino-4-hydroxy-anthraquinone and then, without isolating the leuco 1-amino-4-hydroxy-anthraquinone causing it to react with two different primary amines.

HENRY CHARLES OLPIN.
CHARLES FINLEY TOPHAM.